(No Model.) 3 Sheets—Sheet 1.
T. H. BRIGG.
MEANS FOR CONNECTING DRAFT ANIMALS TO VEHICLES.
No. 486,837. Patented Nov. 22, 1892.
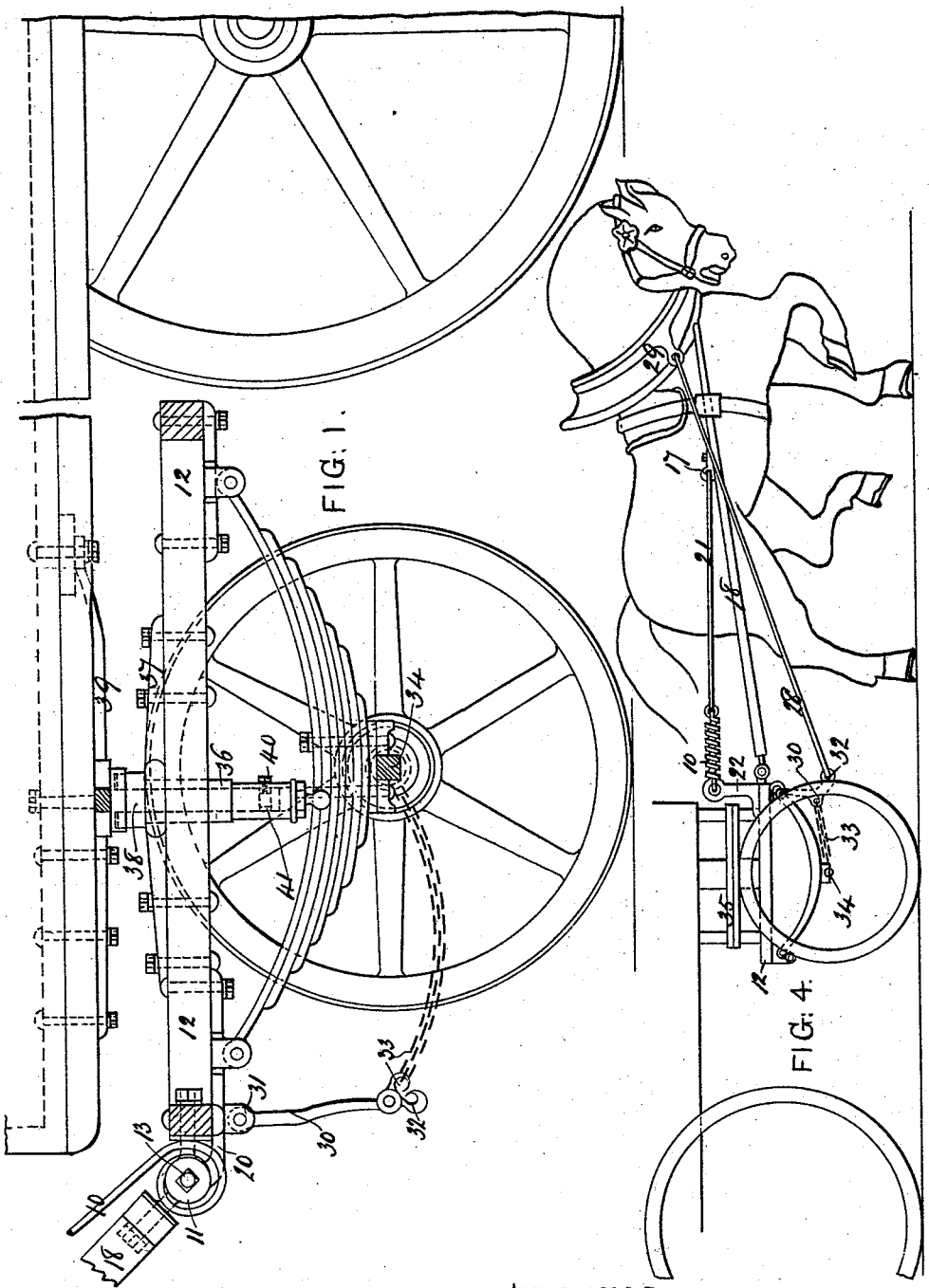
WITNESSES.
Alfred Rawlins
Louis Kershaw.
INVENTOR.
Thomas Hargreaves Brigg.
by Charles Aubrey Day. Attorney.

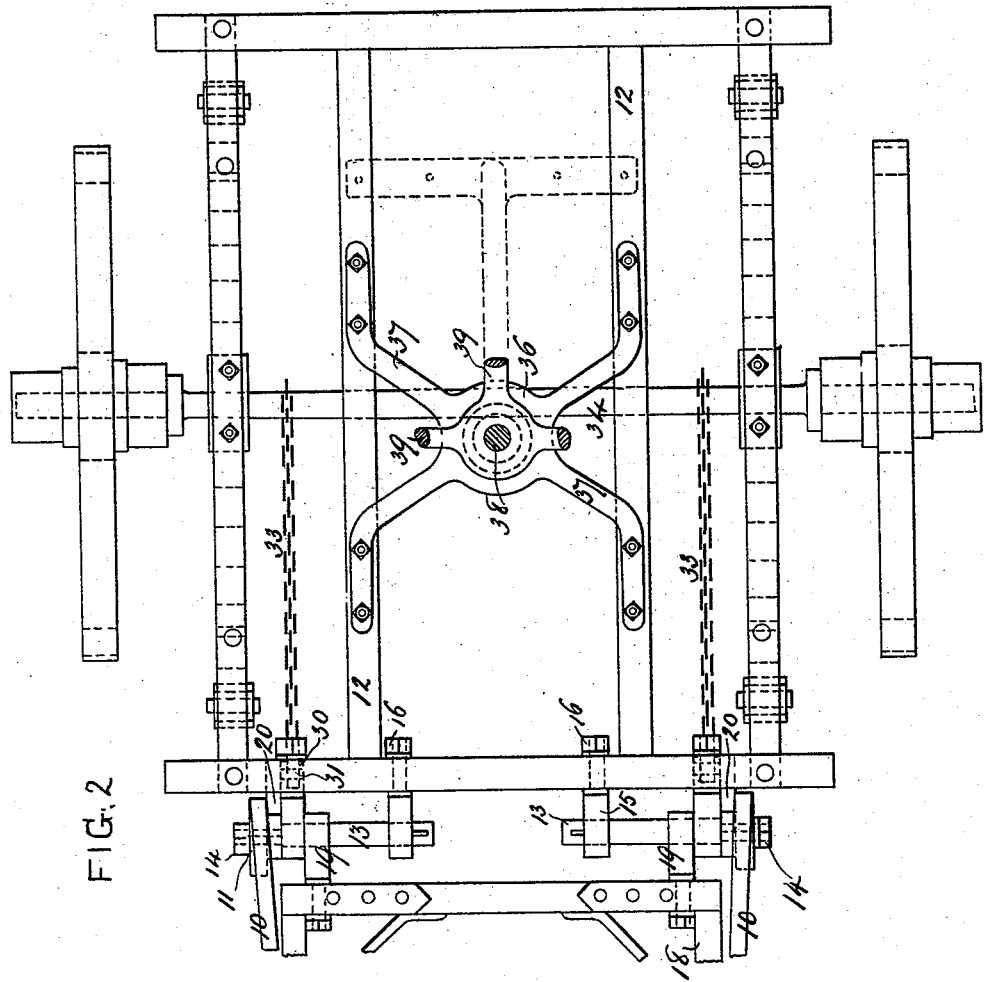

(No Model.) 3 Sheets—Sheet 3.
T. H. BRIGG.
MEANS FOR CONNECTING DRAFT ANIMALS TO VEHICLES.
No. 486,837. Patented Nov. 22, 1892.
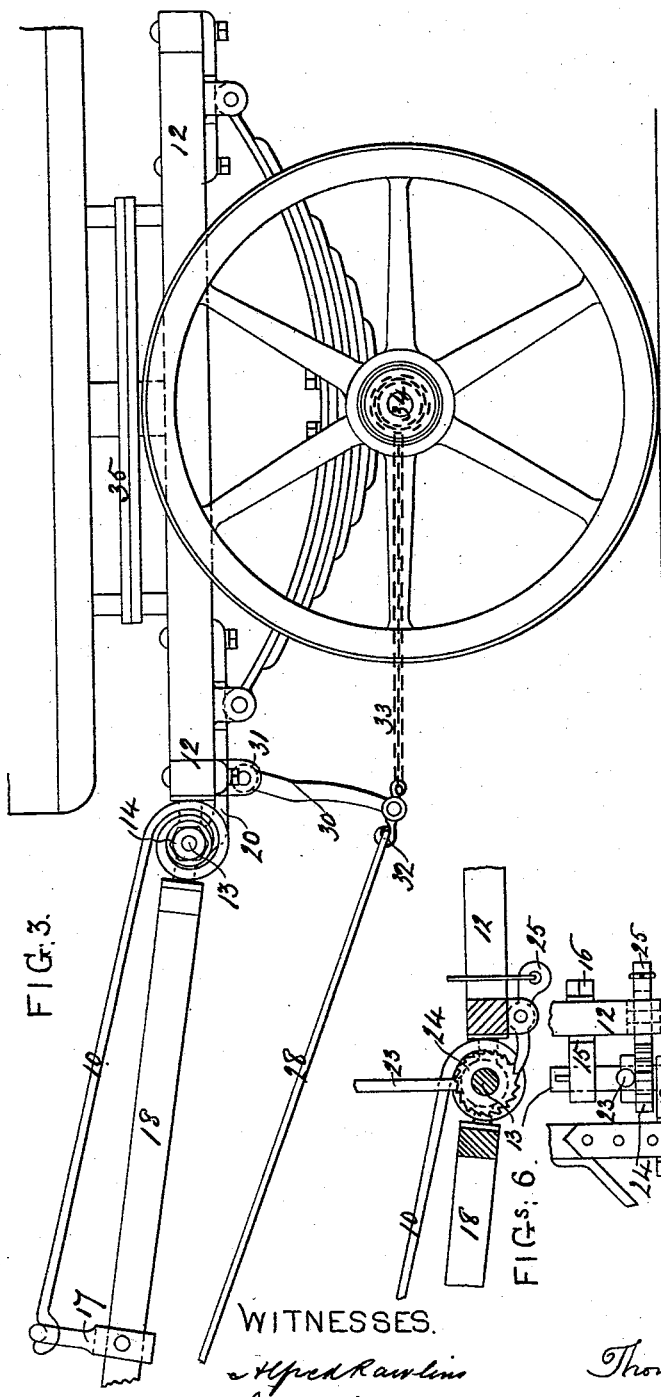
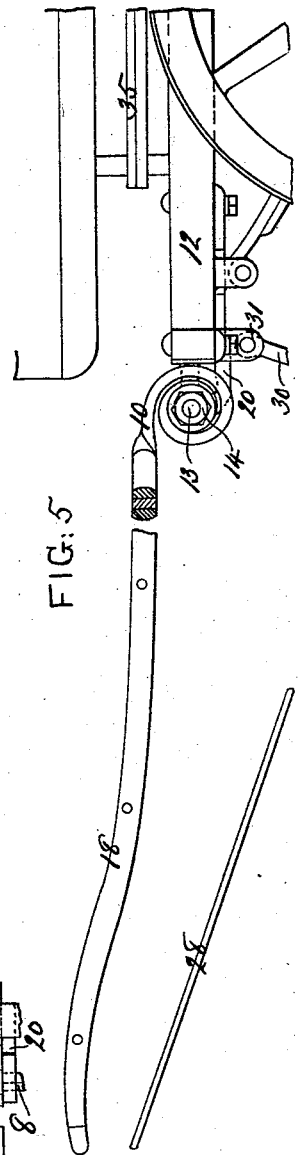
WITNESSES.
Alfred Rawlins
Louis Kershaw
INVENTOR.
Thomas Hargreaves Brigg.
by
Charles Aubrey Day
Attorney.

UNITED STATES PATENT OFFICE.

THOMAS HARGREAVES BRIGG, OF BRADFORD, ENGLAND.

MEANS FOR CONNECTING DRAFT-ANIMALS TO VEHICLES.

SPECIFICATION forming part of Letters Patent No. 486,837, dated November 22, 1892.

Application filed July 18, 1891. Serial No. 399,954. (No model.)

*To all whom it may concern:*

Be it known that I, THOMAS HARGREAVES BRIGG, engineer, a subject of the Queen of Great Britain and Ireland, residing at Bradford, Yorkshire, England, have invented an Improved System of and Means for Connecting Draft-Animals to Vehicles, of which the following is a specification.

This invention relates to the application to vehicles, ground implements, and the like having fore and aft axles and wheels or other fore and aft bearings upon the ground of spring or equivalent lifting devices normally tending to more or less support the fore quarters of a connected draft animal or animals, the main object of the invention being to preserve the connected animal from unnecessary fatigue, in order that its natural forces may be utilized to the best advantage.

In the accompanying drawings, Figure 1 represents in side elevation, partly in section, the fore and aft parts of a two-axled vehicle fitted with the supporting attachments, showing the same in an inoperative position. Fig. 2 represents a sectional plan view of the fore carriage. Fig. 3 represents a side elevation showing the supporting attachments in an operative position. Fig. 4 represents in side elevation a modification of the invention. Fig. 5 represents a like view of another modification, and Fig. 6 represents in sectional elevation and plan view means of adjusting the supporting-power of the attachments as may be required.

10 represents supporting attachments, which are secured, preferably, in an adjustable manner to the fore carriage 12 of the vehicle and are connected to the shafts 18 or directly to the belly-band and operate upon the fore quarters of the connected draft-animal through said connection. The attachments 10 are preferably made as springs, the strength of which should be proportioned to the weight of the shafts, to the position of the points of attachment of the traces to the vehicle, (which should be as lowly placed as the construction of the fore carriage or of the particular vehicle to which the device is to be applied will permit,) to the weight of the draft-animal and to the supporting-power desired to be imparted to the belly-band; but their effective supporting-power can be varied as may be required by adjusting the springs when in their inoperative position. The springs 10 may each be made at the end attached to the fore carriage (*vide* Figs. 1 to 3) of a coiled formation and with a squared boss 11, adapted to fit the outer squared end 8 (*vide* Fig. 2) of a rod 13 and to be secured thereon by a nut 14, there being two independent rods 13, loosely mounted in bearings 15, bolted at 16, to the fore carriage. The springs 10 extend forwardly for any desired length, and by adjustable straps, chains, links, or other convenient means 17, (*vide* Figs. 3 and 4) they are either permanently or detachably, as may be preferred, connected to the shafts 18, which are fitted with bearings 19, loosely mounted on the rods 13, and are connected to the belly and back bands in a usual manner. (*Vide* Fig. 4.) On the squared ends 8 of the rods 13 are also mounted the squared bosses of removable and adjustable stay-bars 20, which project rearwardly under the front bar of the fore carriage and prevent the rods 13 from turning in their bearings 15, when the shafts are pulled down to the position represented in Fig. 3 for connection with the draft-animal, the bars 20 then causing the rods 13 to act as fulcrums to the springs, which consequently become loaded.

In the modification represented in Fig. 4, the springs 10 are made of a spiral form and are connected to a bracket 22, rising from the fore carriage, and are also connected to any convenient part 17 of the shafts by stays 21.

In the modifications represented in Figs. 1 to 4, the spring attachments 10 are separate and distinct from the shafts, excepting their connections thereto at 17; but in the modification represented in Fig. 5 the forward continuations of the spring attachments are made of flat steel and are adapted to serve and act as the shafts of the vehicle, being at such part turned flatwise (*vide* the sectional part in Fig. 5) to run alongside the animal, and thickened up with light wood, as shown in said sectional part or being otherwise suitably covered.

If it be required in any vehicle to adjust the supporting-power of the attachments to suit widely-varying requirements, the rods 13 or other supports acting as the fulcrums or fore-carriage connections of the spring attachments are fitted with hand-levers 23 (*vide* Fig. 6) and with ratchet-wheels 24, fast on the rods 13, and which engage with pawls 25, pivoted to the fore carriage and connected to releasing-cords, as shown in Fig. 6. Other convenient means may, however, be used for adjusting the tension of the springs and maintaining them at the lifting-power required. The aforesaid supporting attachments can be used with the greatest advantage when used conjunctively with steep downwardly-inclined trace attachments, as the resultant of the constant lifting force of the supporting attachments and of the constantly-downward but varying pull of the trace attachments constitutes the virtual angle of draft, giving the advantages due to upwardly-inclined traces (speaking relatively to their connection to the animal) when the resistance is light, those due to horizontal traces when the resistance is moderate, and those due to downwardly-inclined traces when the resistance is heavy, so that such virtual angle of draft and the hauling-power are automatically brought into correspondence with the resistance to traction, the animal's fore quarters being more or less supported, while the angle of draft is above the horizontal, in which latter position the supporting tendency of the attachment is neutralized and weight being transferred through the back-band onto the animal's back, (correspondingly lessening the resistance and increasing the animal's adhesion,) while such angle of draft is below the horizontal. To allow of such low attachment of the traces, the fore carriage is fitted with bearings 31, in which swing pendent arms 30, which are tied back to the fore axle 34 or to any convenient part of the fore carriage by chains 33. The arms 30 may, however, be rigidly bolted to the fore carriage. They are fitted with trace-hooks 32, from which the traces 28 are connected to the hame at 29 in a usual way.

In Figs. 1 and 2 the fore carriage and body of the vehicle are represented as connected by a depending tubular socket 36, which is rigidly secured by widely-extending arms 39 to the fore carriage and by a turned perch-bolt 38, depending within the socket 36 and rigidly secured by widely-extending arms 39 to the body of the vehicle, the parts 36 and 38 being kept in connection by a screw 40, which engages with a surrounding peripheral recess 41 in the perch-bolt, so as to allow of the required turning movements of the fore carriage and body of the vehicle.

In Figs. 3 and 4 the fore carriage and body of the vehicle are represented as connected by a perch-bolt and wheel-plates 35 in an ordinary manner.

Having fully described my invention, what I claim, and desire to secure by Letters Patent, is—

1. A two-axled vehicle provided with shafts, springs arranged to lift up the latter, and lowly-placed trace-fastening attachments, substantially as described.

2. A two-axled vehicle provided with shafts, springs arranged to lift up the latter, and a depending attachment carrying lowly-placed trace-fastening means, substantially as described.

In testimony whereof I have signed my name to this specification in the presence of two subscribing witnesses.

THOMAS HARGREAVES BRIGG.

Witnesses:
CHARLES AUBREY DAY,
LOUIS KERSHAW.